US011532111B1

(12) United States Patent
Zhang et al.

(10) Patent No.: US 11,532,111 B1
(45) Date of Patent: Dec. 20, 2022

(54) SYSTEMS AND METHODS FOR GENERATING COMIC BOOKS FROM VIDEO AND IMAGES

(71) Applicant: Amazon Technologies, Inc., Seattle, WA (US)

(72) Inventors: Dongqing Zhang, Kirkland, WA (US); Muhammad Raffay Hamid, Seattle, WA (US); Xiaohan Nie, Lynnwood, WA (US); Shixing Chen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/344,690

(22) Filed: Jun. 10, 2021

(51) Int. Cl.
*G06F 17/00* (2019.01)
*G06T 11/60* (2006.01)
*G11B 27/031* (2006.01)
*G10L 15/26* (2006.01)
*G06F 40/134* (2020.01)
(Continued)

(52) U.S. Cl.
CPC ............ *G06T 11/60* (2013.01); *G06F 40/134* (2020.01); *G06V 20/46* (2022.01); *G06V 20/49* (2022.01); *G06V 40/161* (2022.01); *G10L 15/26* (2013.01); *G11B 27/031* (2013.01)

(58) Field of Classification Search
CPC ....... G06T 11/60; G06F 40/134; G06V 20/46; G06V 20/49; G06V 40/161; G10L 15/26; G11B 27/031
See application file for complete search history.

(56) References Cited

U.S. PATENT DOCUMENTS 9,105,114 B2 * 8/2015 Dohta ....................... G06T 7/12
9,286,668 B1 * 3/2016 Angilivelil ............... G06T 7/00
9,588,651 B1 * 3/2017 Buchanan ........... G06F 3/04815
(Continued)

FOREIGN PATENT DOCUMENTS

CN          103392187 A  * 11/2013  ......... G06K 9/00785
WO    WO-2005093638 A1 * 10/2005  ......... G06K 9/00765

OTHER PUBLICATIONS

Guangmei, Jing, et al., "Content-Aware Video2Comics with Manga-Style Layout", IEEE Transactions on Multimedia, vol. 17, Issue 12, pp. 2122-2133, Nov. 13, 2015 (Year: 2015).*
(Continued)

*Primary Examiner* — Laurie A Ries
(74) *Attorney, Agent, or Firm* — Kilpatrick Townsend & Stockton LLP

(57) ABSTRACT

Techniques for a comic book feature are described herein. A visual data stream of a video may be parsed into a plurality of frames. Scene boundaries may be determined to generate a scene using the plurality of frames where a scene includes a subset of frames. A key frame may be determined for the scene using the subset of frames. An audio portion of an audio data stream of the video may be identified that maps to the subset of frames based on time information. The key frame may be converted to a comic image based on an algorithm. First dimensions and placement for a data object may be determined for the comic image. The data object may include the audio portion for the comic image. A comic panel may be generated for the comic image that incorporates the data object using the determined first dimensions and the placement.

19 Claims, 9 Drawing Sheets

(51) Int. Cl.
  *G06V 20/40* (2022.01)
  *G06V 40/16* (2022.01)

(56) References Cited

U.S. PATENT DOCUMENTS

| | | | | |
|---|---|---|---|---|
| 10,452,920 | B2* | 10/2019 | Kauffmann | H04N 5/147 |
| 10,459,975 | B1* | 10/2019 | Malpani | G06F 16/735 |
| 10,970,843 | B1* | 4/2021 | Olsen | H04N 21/4316 |
| 10,977,431 | B1* | 4/2021 | Burke | G06F 40/166 |
| 2002/0015050 | A1* | 2/2002 | Kawai | G06T 11/00 |
| | | | | 345/635 |
| 2003/0192049 | A1* | 10/2003 | Schneider | H04N 21/854 |
| | | | | 348/E7.063 |
| 2005/0212821 | A1* | 9/2005 | Xu | G06T 11/00 |
| | | | | 345/647 |
| 2006/0117356 | A1* | 6/2006 | Jojic | H04N 21/44029 |
| | | | | 725/135 |
| 2006/0212897 | A1* | 9/2006 | Li | H04N 7/17336 |
| | | | | 725/32 |
| 2009/0135198 | A1* | 5/2009 | Lee | G06T 15/02 |
| | | | | 345/619 |
| 2011/0047163 | A1* | 2/2011 | Chechik | G06F 16/70 |
| | | | | 707/E17.071 |
| 2011/0251896 | A1* | 10/2011 | Impollonia | H04N 21/84 |
| | | | | 705/14.55 |
| 2012/0257876 | A1* | 10/2012 | Gupta | G11B 27/034 |
| | | | | 386/E5.028 |
| 2013/0219269 | A1* | 8/2013 | Cranfill | G06F 3/0488 |
| | | | | 715/256 |
| 2014/0019865 | A1* | 1/2014 | Shah | G06F 3/0484 |
| | | | | 715/731 |
| 2014/0040715 | A1* | 2/2014 | Younge | G06F 40/169 |
| | | | | 715/203 |
| 2016/0029106 | A1* | 1/2016 | Chen | H04N 21/47205 |
| | | | | 386/282 |
| 2017/0213576 | A1* | 7/2017 | Nugumanov | G11B 27/28 |
| 2018/0196685 | A1* | 7/2018 | Dorr | G06F 9/45558 |
| 2020/0160845 | A1* | 5/2020 | Lavilla | G10L 15/005 |
| 2022/0084222 | A1* | 3/2022 | Nie | G06T 7/73 |
| 2022/0155940 | A1* | 5/2022 | Olbrich | G06Q 30/0631 |

OTHER PUBLICATIONS

"Clip2Comic Cartoon & Comic App", Available Online at: https://apps.apple.com/us/app/clip2comic-cartoon-comic-app/id876328355, Accessed from Internet on Jun. 25, 2021, pp. 1-4.

"Comixify—AI Driven Story Telling", Available Online at: https://comixify.ai/information, Accessed from Internet on Jun. 25, 2021, pp. 1-7.

"Storyboard", Available Online at https://play.google.com/store/apps/details?id=com.google.android.apps.photolab.storyboard&hl=en_US&gl=US, Accessed from Internet on Jun. 25, 2021, pp. 1-3.

* cited by examiner

SYSTEMS AND METHODS FOR GENERATING COMIC BOOKS FROM VIDEO AND IMAGES

BACKGROUND

Streaming content providers can enable users to explore, interact, and consume a variety of events (e.g., live sports games, live video game eSport events, movies, television episodes, etc.) and thereby explore a variety of real, virtual, or non-real (e.g., fantasy or sci-fi) stories from the safety and comfort of their own homes. As streaming content technology advances and the audience demand increases, more streaming content providers seek to engage more users and satisfy the demand by providing additional content for users to consume. However, streaming content providers lack solutions for converting content to different media types. Users may wish to convert their favorite movie or television episode into other media formats for posterity or mobility. Conventional technology solutions such as printers may fail to properly capture the story or narrative aspect of the media and thereby further impact the user's consumption of the converted media.

BRIEF DESCRIPTION OF THE DRAWINGS

Various embodiments in accordance with the present disclosure will be described with reference to the drawings, in which.

DETAILED DESCRIPTION

Figure 1:
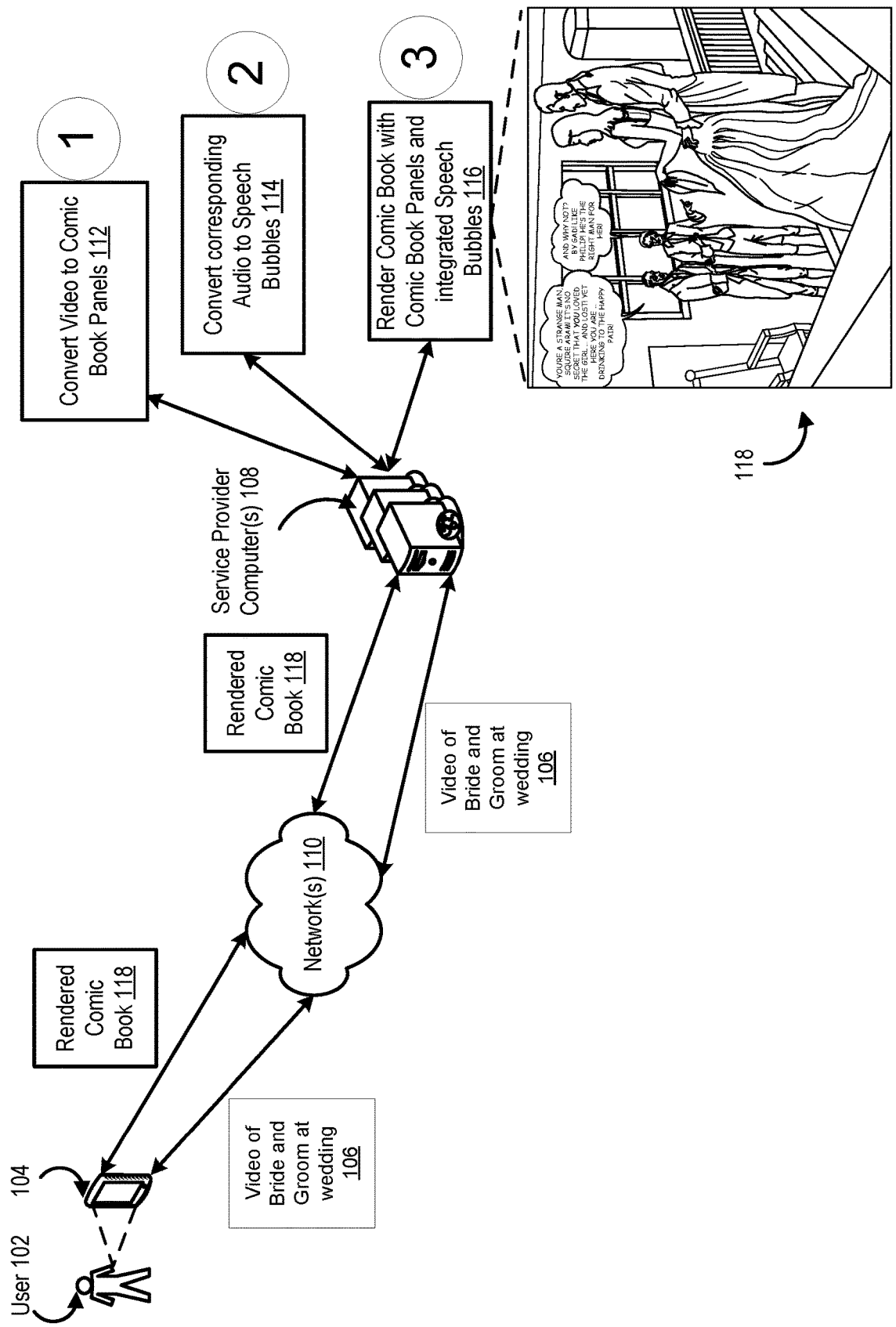
FIG. 1 illustrates an example workflow for a comic book feature in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide for a comic book feature that can be applied to content such as digital media content (e.g., digital video or images) to convert the photorealistic media to an animated or non-photorealistic style and generate a comic item from the media content. A comic item may include a wide variety of comic-style content including comic books, comic strips, graphic novels, etc. A comic item may be referred to as a comic book in the current disclosure. For example, a user may submit a movie which may serve as input which is converted into a comic book that converts the photorealistic content of the movie into a non-photorealistic style or animated style that is rendered in a comic book format. The comic book may be provided in both digital form and paper form to enable users to enjoy certain media in other formats which conventionally are not available. Photorealistic may refer to media which includes a real life capture or rendering of items or objects in a media format. Non-photorealistic may include media which depicts a stylized rendering of items or objects in a media format. In embodiments, service provider computers implementing the comic book features may receive a request from a user and associated user device to convert an input data stream (e.g., video or image) to a comic book. The comic book feature described herein may parallel process both a visual data stream and audio data stream of the input data stream to generate the comic book. The service provider computers may extract frames from the visual data stream and select the frames based on their importance to maintaining the narrative of media content associated with the input data stream.

The selected frames are converted into a comic-style image using an image-to-comic conversion algorithm implemented by the service provider computers. In parallel, the service provider computers may extract relevant audio portions from the audio data stream for generating a data object (a user interface object that is integrated into a comic image) that represents a speech bubble (a field for inserting text in a comic image). The data object may include text for an audio portion which corresponds to a selected frame such that audio from one part of the content is not attributed to an incorrect frame or scene for the comic book. The data object may be comprised of text which corresponds to a speech bubble derived from audio data stream of the input data stream (e.g., a video or image) or other sound elements included in the audio data stream (e.g., background sounds, narrative speech, music lyrics, etc.). In accordance with at least one embodiment, the service provider computers may utilize metadata or time information associated with the audio data stream, such as close captioning information, to attribute the audio portion to the correct selected frame. The service provider computers may be configured to determine placement and dimensions for the data object for a selected frame such that objects in a converted comic image are not obstructed or occluded. In accordance with at least one embodiment, the text of the audio portion may be shortened or reduced to fit into the dimensions of the data object for a comic panel. The service provider computers may be configured to render a comic panel that integrates the data object in the determined placement and of the determined dimensions to avoid obstructing the objects of the comic image.

In accordance with at least one embodiment, the comic book feature includes determining a comic book panel layout for each comic book page to optimize the layout of a given comic book page given one or more comic panels of various dimensions and included objects and speech bubbles. In embodiments, the service provider computers implementing the comic book feature may be configured to utilize a number of algorithms for converting an input data stream into a comic book. The service provider computers may extract a plurality of frames from the visual data stream for identifying one or more scenes which comprise the content associated with the input data stream. A scene may include a sequence of frames that appear to be visually continuous in terms of color, motion, objects, and background in the frames. The comic book feature may implement a color and edge histogram algorithm to identify scene boundaries for determining one or more scenes from the plurality of frames of the visual data stream. The service provider computers may utilize input or information from a content creator or author to identify the scene boundaries. A key frame may be determined for each scene which may be representative of the scene or includes the main content for the scene to maintain the narrative flow of the content associated with the input data stream. In embodiments, an individual key frame may be selected for each scene or one or more key frames may be selected for a given scene. For example, a scene of a video may be determined to include important narrative content such that multiple key frames will be selected for the same scene.

A comic image may include a comic style image, an animated style image, a non-photorealistic image, or a conversion from one animated style, such as 3D animated style, to a 2D animated style. A comic panel may include a comic image comprised of one or more objects and speech bubbles (e.g., data objects) which include text extracted from an audio data stream of content used to derive the comic book. A comic book may include one or more comic book pages which each contain one or more comic panels. In embodiments, the service provider computers may render a digital form of the comic book for transmittal to a user device. The user device may be configured to present the comic book via a user interface and receive input of interactions with the comic book such as zooming into particular sections of a comic book page, navigating between pages of the comic book, or selecting other stored or retrieved comic books. In embodiments, a user may interact, via the user device, with a user interface presenting a comic book to select a particular comic panel of a comic book page. In response to the interaction the user device may be configured to send a request and receive a response from the service provider computers for presenting a video clip or portion which corresponds to the visual data stream from which the comic panel was derived.

The processes and systems described herein represent an improvement on conventional comic book creation techniques. For example, the production of comic books typically requires artists and creative designers (e.g., expert talent), which involves drawing, redrawing, editing, and/or manual effort/review, all of which can be a time consuming, manual, and costly process. This can lead to a limited variety of comic books available for customers, and limited artistic styles in which each comic book can be created. The current disclosure includes solutions for automatically or semi-automatically generating comic books. Conventional systems lack the integration of audio from a content source into a generated comic book and utilize limited input streams and/or require manual effort. The disclose improves on conventional systems by utilizing a wide variety of input data streams such as movies, television shows, animated shows, and/or user generated content to convert to comic books. The resultant comic books may be rendered in different comic book styles depending on user preferences and the generation of the comic book can be performed much faster than conventional comic book creation processes. The systems and methods described herein also process both the visual data streams and audio data streams in parallel to ensure proper integration of the appropriate speech bubbles into each comic panel and selection of layouts for the comic panels to ensure proper narrative flow of the content from which the data streams were derived.

FIG. 1 illustrates an example workflow for a comic book feature in accordance with at least one embodiment. FIG. 1 depicts workflow 100 which includes a user 102 interacting with a user device 104 to provide a video 106 to service provider computers 108, via networks 110, for converting into a comic book. The video 106 may be of a wedding. In accordance with at least one embodiment, the user 102 may transmit the video 106 using the user device 104 as part of a request to convert the video using a comic book feature implemented by the service provider computers 108. Although a video of a realistic event such as a wedding is described embodiments described herein are not limited to converting photorealistic events to a comic book. Images or video of animated media or other types of photorealistic environments may be converted into a non-photorealistic style or comic book style. In embodiments, the user 102 may be presented with a user interface via user device 104 to select an input data stream, such as video 106, that is stored locally on user device 104 or stored remotely, such as a streaming movie offered by a streaming content provider. In embodiments, the service provider computers 108 may be configured to convert the video to comic book panels 112 while simultaneously converting associated audio to speech bubbles 114.

The service provider computers 108 may be configured to generate a data object for integration or that will be incorporated into the comic book panels and include text derived from the audio portion which corresponds to a particular comic book panel (comic panel). Colloquially the text included in a comic panel of a comic book is referred to as a speech bubble. In embodiments, the audio portion may be mapped to a key frame or scene from which the key frame is selected that is part of the video 106. For example, a comic panel may depict two characters conversing about a plot to secure a package. The data object may include text which corresponds to audio for this conversation or a portion of the audio such that the narrative of the scene is not lost. As described herein, converting the audio to speech bubbles 114 (data objects) can include using a speech to text algorithm, accessing text from close captioning information, or obtaining other audio information which can be used to generate the audio and text for a given scene and key frame. The workflow 100 includes the service provider computers 108 rendering a comic book with comic book panels and integrated speech bubbles 116. As is described above and with further detail below, the service provider computers 108 may utilize a layout algorithm to determine an optimized layout of comic panels to arrange one or more comic panels and generate a comic book page which will be combined with other comic book pages to generate a comic book 118.

In accordance with at least one embodiment, the service provider computers 108 may be configured to transmit the rendered comic book 118 to the user device 104 via networks 110 for presentation to the user 102. In embodiments, the user device 104 may be configured to present the rendered comic book 118 via a web browser or an application such as a native application of the user device 104. In accordance with at least one embodiment, the service provider computers 108 may be configured to maintain a mapping of comic panels to the portion of video 106 (e.g., particular scene, key frame, or portion of visual data stream) which was used to render the comic panel 112 and speech bubble 114. The user 102 may interact with the user interface of user device 104 to select a particular comic panel of the rendered comic book 118. The selection can trigger the redirection of the browser or cause an updated to the browser or application of user device 104 to present the portion of video 106 which corresponds to the comic panel. The short clip or portion of video 106 may include the audio as well which was used to generate the associated speech bubble 114. In embodiments, the selection can be transmitted to the service provider computers 108 via networks 110 for obtaining, by the service provider computers 108, the appropriate portion of the video 108. The service provider computers 108 may transmit the short clip or portion of the video 108 back to the user device 104 via networks 108 for presentation to the user 102. In accordance with at least one embodiment, the workflow 100 may include converting the video to comic book panels 112 (represented in FIG. 1 as step 1), then convert corresponding audio to speech bubbles 114 (represented in FIG. 1 as step 2), and finally render a comic book with comic book panels and integrated speech bubbles 116 (represented in FIG. 1 as step 3). Although FIG. 1 depicts an ordered process proceeding from step 1 to step 3 embodiments described herein are not limited to just the ordered process depicted in FIG. 1.

Figure 2:
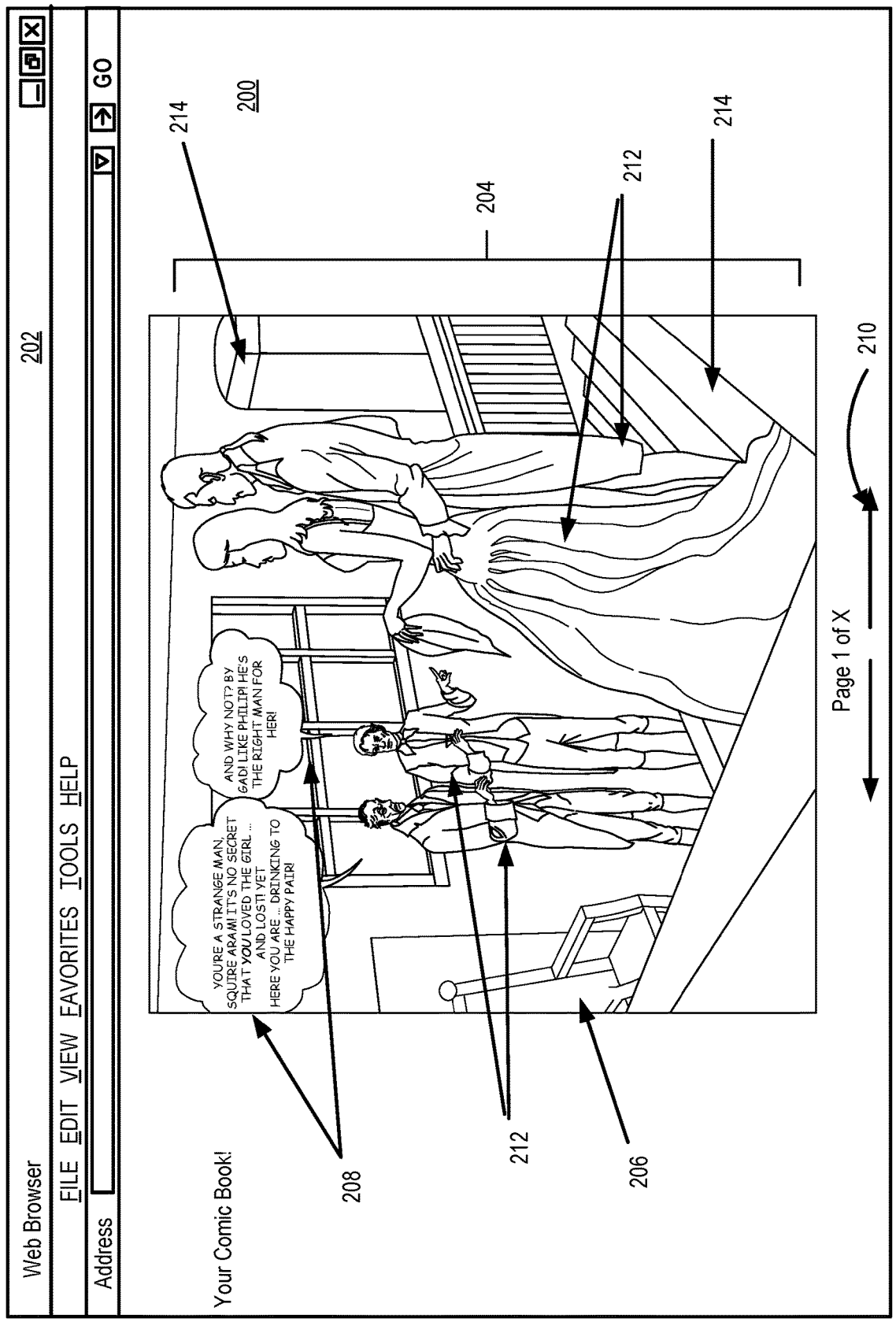
FIG. 2 illustrates an example user interface for presenting a rendered comic book according to a comic book feature in accordance with at least.

FIG. 2 illustrates an example user interface for presenting a rendered comic book according to a comic book feature in accordance with at least. FIG. 2 depicts user interface 200 presented via a web browser 202 for presenting a comic book page 204 which includes a comic panel 206 and one or more data objects 208 (speech bubbles). As described herein, a comic book rendered by the service provider computers implementing the comic book feature may generate the comic book for presentation via a web browser, such as web browser 202, or via an application of a user device/computing device. The user interface 200 may include navigation user interface objects 210 for navigating between pages of a rendered comic book. Although FIG. 2 depicts a comic book page 204 which includes a single comic panel 206, embodiments described herein include rendering a comic book page which includes a plurality of comic panels which are arranged in a certain layout to optimize the dimensions of each comic panel and integrated comic images and data objects.

The comic book page 204 includes a placement of data objects 208 so as to avoid obstructing objects such as the characters 212 as well as certain portions of the background or environment 214. In embodiments, the comic book feature includes determining dimensions and placement of the data objects 208 so as to avoid occluding or obstructing the characters 212 (objects) of the comic image or comic panel 206 while still conveying the text of the corresponding audio portion. In accordance with at least one embodiment, the service provider computers implementing the comic book feature may utilize different types of data objects (e.g., different visual styles including size, shape, design, and color) for certain types of audio portion. For example, one type of data object may be utilized to convey speech from one character to another character while another and different type of data object may be utilized to depict internal monologue or narrative speech from a narrator. In embodiments, the service provider computers may implement an object detection algorithm to identify the characters 212 (objects) and background or environment 214 included in the comic image as well as locations for the characters 212 and background or environment 214 of the comic image. The object detection algorithm may be configured to identify the location and dimensions of the objects included in a comic book image which can be used to determine placement and dimensions for the data objects 208. In scenarios where the text of the audio portion associated with data objects 208 cannot fit within the dimensions of the data objects 208, the service provider computers may implement a text shortening algorithm for reducing the content of the text. In embodiments, the text shortening algorithm may analyze the text to determine a semantic meaning of the sentence(s) and text and keep only the important words in the sentence(s) so that the semantic meaning can be retained. In embodiments, a human entity can review the result of the text-shortening algorithm and provide verification that the sentence is accurate and does not contain any grammatical or narrative errors.

Figure 3:
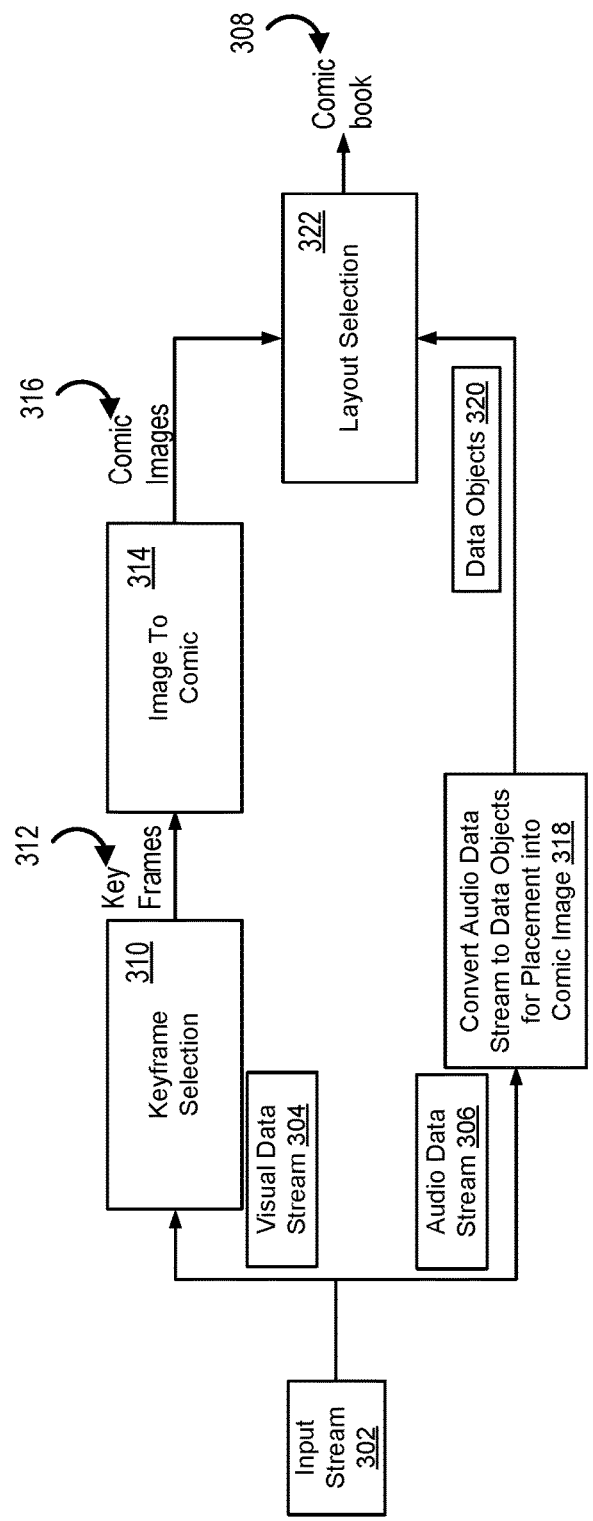
FIG. 3 illustrates an example workflow for a comic book feature in accordance with at least one embodiment.

FIG. 3 illustrates an example workflow for a comic book feature in accordance with at least one embodiment. The workflow 300 of FIG. 3 includes an input stream (input data stream) 302. In embodiments, the input stream 302 can include media content such as a video or an image of non-animated style or photorealistic style although the comic book features can work with animated content as well. The workflow 300 may be implemented by the service provider computers implementing the comic book features. In accordance with at least one embodiment, the service provider computers may be configured to extract or parse the visual data stream 304 and the audio data stream 306 from the input stream 302. In embodiments, the audio data stream 306 may be include closed captioning channels associated with the input stream 302 or media content which can be used to parse the audio data stream 306. The audio data stream 306 may include metadata or time information which indicates time periods at which the audio is to be presented along with the visual data stream 304 during presentation of the originating content or when subtitles are to be presented. In accordance with at least one embodiment, the metadata or time information can be used to map an audio portion of the audio data stream 306 to particular key frames.

The workflow 300 includes generating a comic book 308 from the input stream 302. In embodiments, a comic book is comprised of a number of comic book pages. Each comic book page contains one or more comic panels arranged in a certain layout. In accordance with at least one embodiment, a comic panel includes a converted frame of the plurality of frames which comprise the visual data stream 304. The converted frame is converted by an image to comic style conversion algorithm that typically converts a photorealistic image to a non-photorealistic image. In embodiments, a comic panel includes data objects (speech bubbles) that are overlaid on the comic image to depict the audio portion associated with the frame or scene from which the comic image was derived. For example, speech bubbles may be used to convey dialogue between two characters included in the converted comic image. The workflow 300 includes key frame selection 310 for generating one or more key frames 312. In embodiments, key frames represent candidate images for converting to comic book images. A key frame represents a frame from a scene which is informative and summarizes the narrative flow for a scene. A key frame must also be non-redundant. As described herein the frames of a scene may be pruned or reduced to remove redundancy and increase the accuracy for selecting an appropriate key frame for each scene. In embodiments, the service provider computers may implement one or more algorithms for determining scene boundaries and generating one or more scenes using the frames from the visual data stream 304. The determined scenes may have one or more frames which are determined to be redundant removed prior to selecting a key frame 312 for the scene.

The workflow 300 includes an image to comic conversion 314 process to generate comic images 316. Once the key frames 312 are selected from the visual data stream 304, the service provider computers implementing the comic book feature will utilize one or more computer vision based algorithms to generate the comic images 316. The algorithms may include a non-photorealistic rendering algorithm, a style-transfer algorithm, or a generative adversarial network algorithm. The key frame 312 to comic image 316 conversion process (314) is automatically performed by the service provider computers. The service provider computers in parallel, as depicted in workflow 300, are configured to convert 318 the audio data stream 306 to data objects 320 for placement into the comic images 316. The conversion 318 generates the data objects 320 (speech bubbles) for overlay or placement onto the comic images 316. The service provider computers may utilize a text shortening algorithm to shorten the text that corresponds to an audio portion of the audio data stream 306 for a key frame 312 and comic image 316.

As is described herein, the service provider computers are configured to utilize an object detection algorithm to avoid placing the data object 320 with the text in such a way as to obscure or occlude the objects of the comic image 316 from the reader. In accordance with at least one embodiment, the service provider computers may utilize a face detection algorithm to detect faces for associating the data objects 320 to key frames 312 and objects within the key frames 312. In embodiments, the service provider computers implementing the comic book feature may utilize a speaker identification algorithm to associate the text of the audio data stream 306 of a data object 320 to a face included in the comic images 316 for a key frame 312. In scenarios where multiple faces are detected a scene may include multiple key frames 312 and the data objects 320 may be split across the multiple key frames 312 for the scene. A facial detection algorithm may be utilized to detect the location of faces within a comic image 316. The workflow 300 depicts a layout selection 322 for determining an optimized layout for all the comic panels that are going to comprise a comic book page of the comic book 308. In accordance with at least one embodiment, a speech bubble placement algorithm may be implemented by the service provider computers to identify vacant space within each comic image 316 for placing the data objects 320. Text justifications may also be identified for the data objects 320 to find an optimal placement and orientation of the data objects 320 for each comic image 316.

Figure 4:
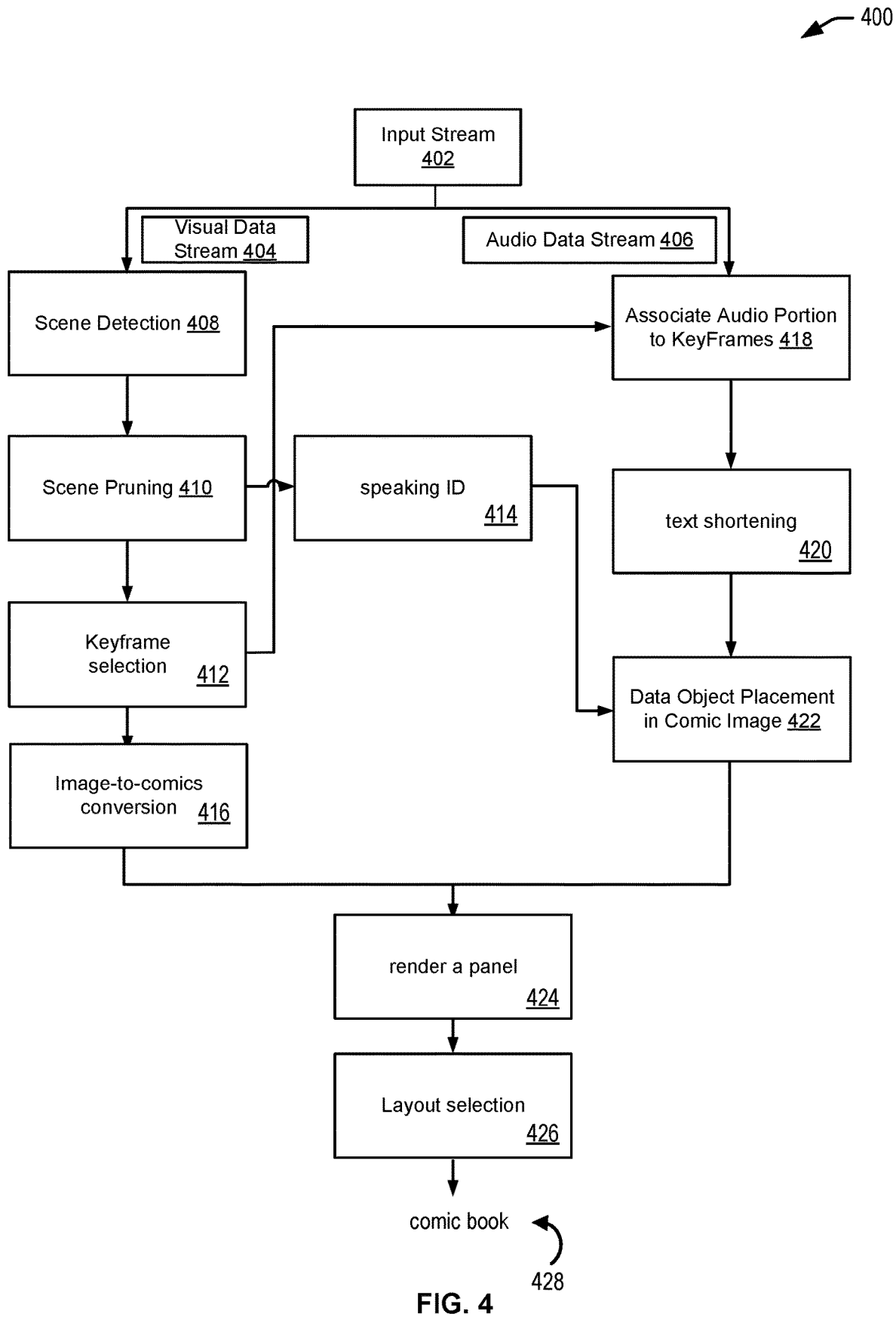
FIG. 4 illustrates an example workflow for a comic book feature in accordance with at least one embodiment.

FIG. 4 illustrates an example workflow for a comic book feature in accordance with at least one embodiment. The workflow 400 of FIG. 4 includes an input stream 402 from which a visual data stream 404 and an audio data stream 406 are extracted. The workflow 400 includes performing a scene detection 408 process. As described herein, a scene includes a sequence of video frames that appear to be visually continuous in terms of color, motion, objects, and background of the frames. Scene detection 408 can be implemented by utilizing a color and edge histogram algorithm implemented by the service provider computers. The workflow 400 includes a scene pruning 410 process. The scene detection 408 process can result in scenes which include redundant frames or scenes which have similar content. The scene pruning 410 process can reduce the number of frames in each scene or remove certain scenes by utilizing a summarization algorithm (scene summarization algorithm). The summarization algorithm is configured to select a subset of scenes or frames within a scene from a totality of scenes or frames while maximizing a defined objective. The optimization of the objective function of the algorithm may be achieved by implementing a graph-partitioning algorithm or submodular function optimization.

The workflow 400 includes a key frame selection 412 process for selecting a key frame to represent each scene. In embodiments, the key frame selection 412 process may include selecting the frame that falls in the middle of all the frames which comprise a scene (post scene pruning 410 process). In some embodiments, the service provider computers implementing the comic book features may utilize a face detection algorithm which detects faces as well as peak facial expression of a character in a frame which is then selected as the key frame for the scene. The workflow 400 includes a speaker identification 414 process for associating the correct audio from the audio data stream 406 to the correct character in the correct key frame. The speaker identification 414 process may be configured to attribute certain audio portions to certain characters within a scene and key frame. The workflow 400 includes an image-to-comics conversion 416 process for converting a video frame to a comic style image. The service provider computers implementing the comic book features may utilize a non-photorealistic rendering algorithm or one or more deep-learning based algorithms. Examples of the deep-learning algorithms include a style-transfer algorithm and a Generative Adversarial Network (GAN) based algorithm. The style-transfer algorithm may utilize one or more comic images as an example for the algorithm to transform a natural image input to a comic style that is similar to a provided template comic image. The GAN-based algorithm may be trained using a set of real-images and comic images to transform a real-image into a comic image (e.g., photo-realistic to non-photorealistic).

The workflow 400 includes associating audio portion to key frame 418 process. The service provider computers implementing the comic book features may be configured to, in parallel, generate data objects which correspond to audio of the audio data stream 406 for incorporation into a comic panel. The data objects include text derived from the audio data stream 406 which are attributed to particular key frames and/or scenes from the visual data stream 404. The associating audio portion to key frame 418 process may utilize time stamps or time information from the audio data stream 406 to map the audio portions to scenes and/or key frames of the visual data stream 404. The process 400 includes a text shortening 420 process for removing some text in scenarios where the text would take up an unfeasibly large space in the comic image or would not fit within the dimensions of a generated data object. The text shortening 420 process can be verified via a human editor for accuracy.

The speaker identification 414 process may utilize a speaker identification algorithm to assign text of a data object to character's faces included in a given key frame. The speaker identification algorithm may identify a talking face in a scene based on facial movement detection between frames of the scene, transcribing the talking face's voice, and aligning audio portion text with the transcribed speech from the talking face (e.g., character). In scenarios where there are multiple talking characters, the service provider computers may be configured to split a scene into multiple key frames in order to associate the appropriate data objects and included text with the correct characters. In embodiments, a comic panel can include multiple characters and data objects representing the dialogue between characters. The workflow 400 includes a data object placement in comic image 422 process. The data object placement in comic image 422 process may be configured to optimize the size or dimensions of a data object as well as identify an appropriate location in a comic image for placement of the data object. The service provider computers implementing the comic book features may utilize a greedy algorithm which generates all possible data objects by trying different text justifications of the audio potion as well as all possible vacant spaces in a comic image that would not block objects in the comic image.

The greedy algorithm would then match candidate data objects with candidate spaces to calculate pairwise matching scores which are then sorted by a set of criteria such as aspect ratio and positions. The workflow 400 includes rendering a panel (comic panel) 424 which includes a comic image with an integrated data object(s). As described herein, a comic book page or comic page may include one or more comic panels. The workflow 400 includes a layout selection 426 process for forming comic book pages comprised of one or more comic panels. The service provider computers may utilize a layout optimization algorithm that is configured to iteratively loop through a plurality of layout templates with a given set of comic book panels and calculate a score according to a set of criteria. The set of criteria may include whether character faces and data objects can be viewed by a reader. An optimized layout may be selected based on the score of the layout that incorporates the comic panels being higher than the score of all the other comic panel layouts for a given comic book page. The workflow 400 includes generating the comic book 428 using one or more rendered comic panels.

Figure 5:
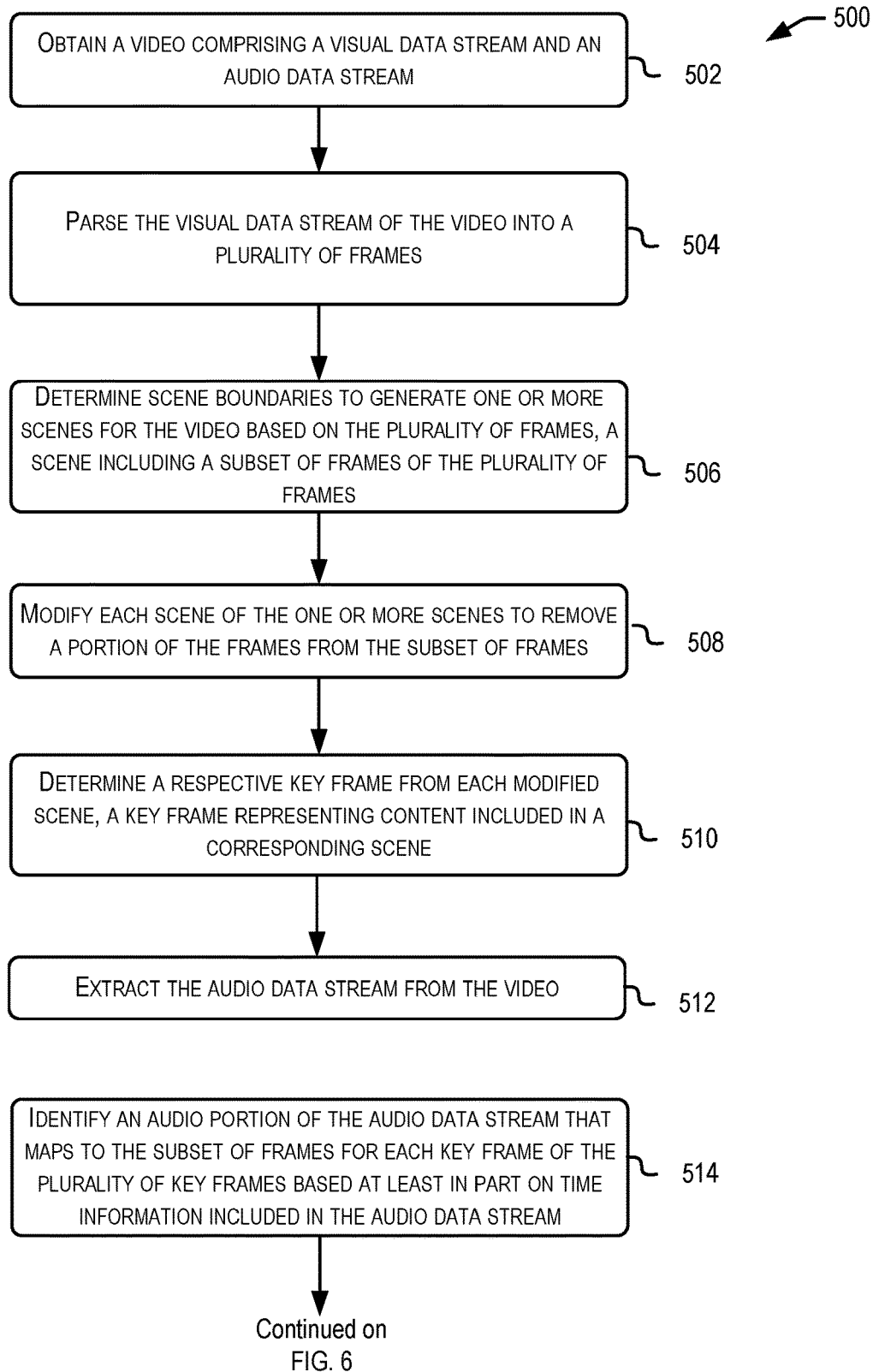
FIG. 5 illustrates a flow diagram of a process for a comic book feature in accordance with at least one embodiment.
Figure 6:
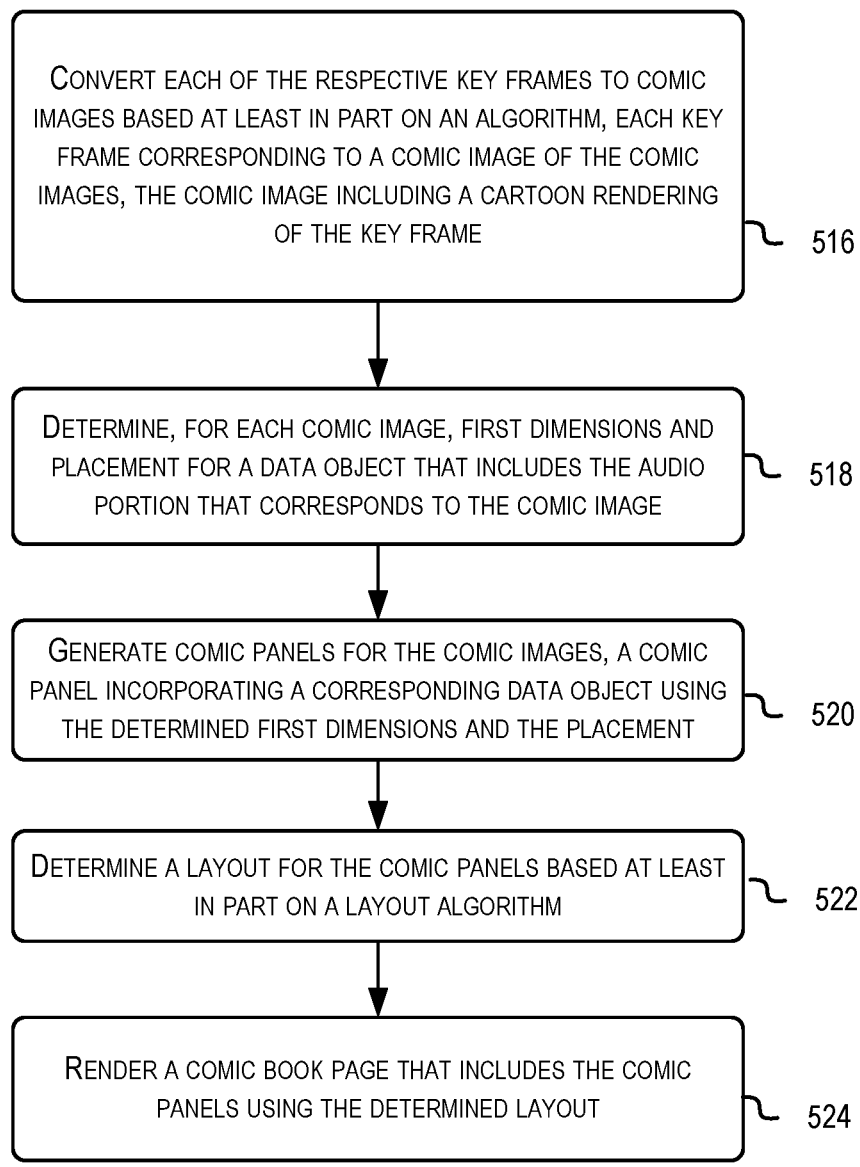
FIG. 6 illustrates a flow diagram of a process for a comic book feature in accordance with at least one embodiment.
Figure 7:
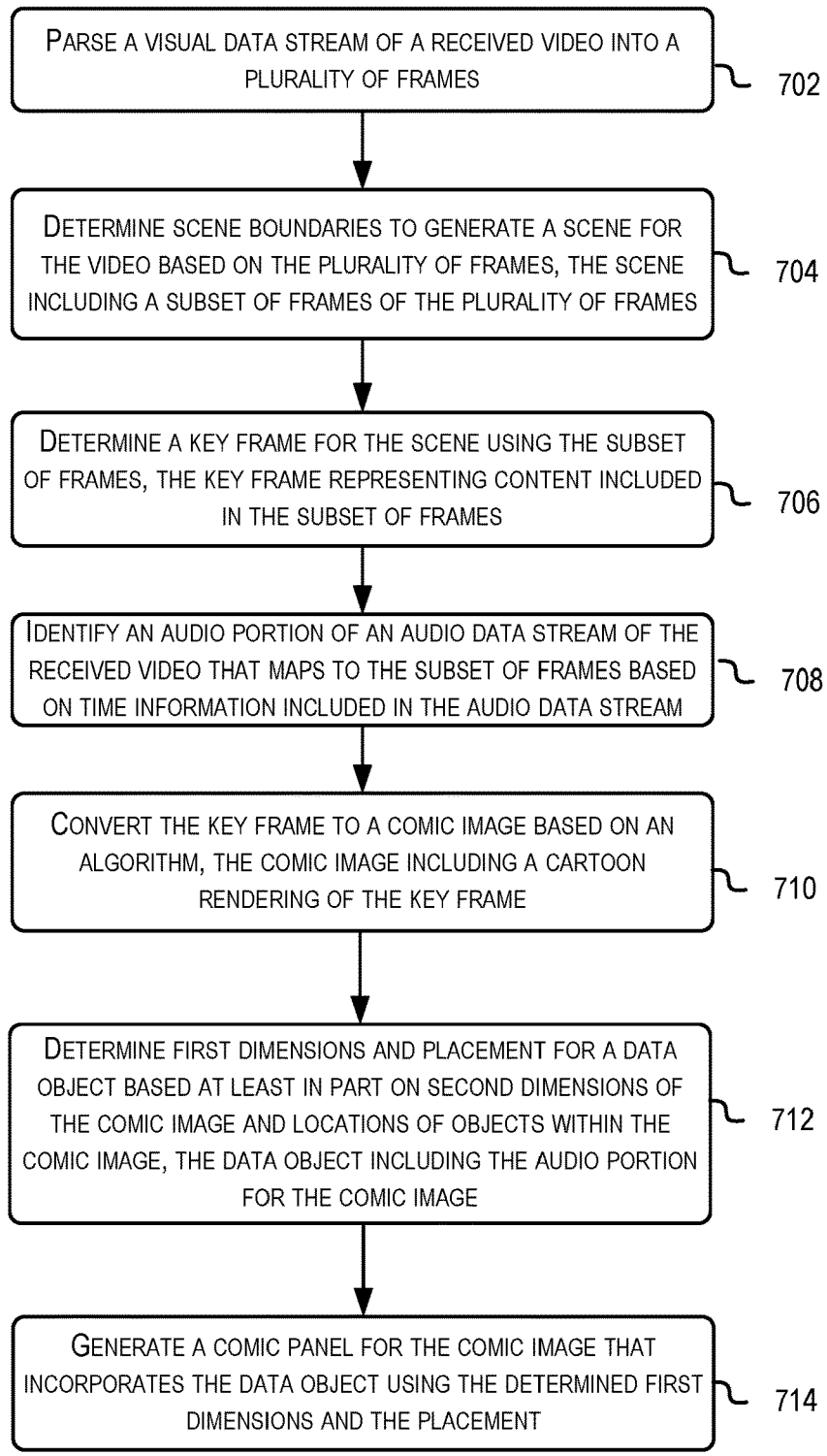
FIG. 7 illustrates a flow diagram of a process for a comic book feature in accordance with at least one embodiment.

FIGS. 5, 6, and 7 illustrate example flow charts for comic book features, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process (or any other processes described herein, or variations and/or combination thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

Figure 8:
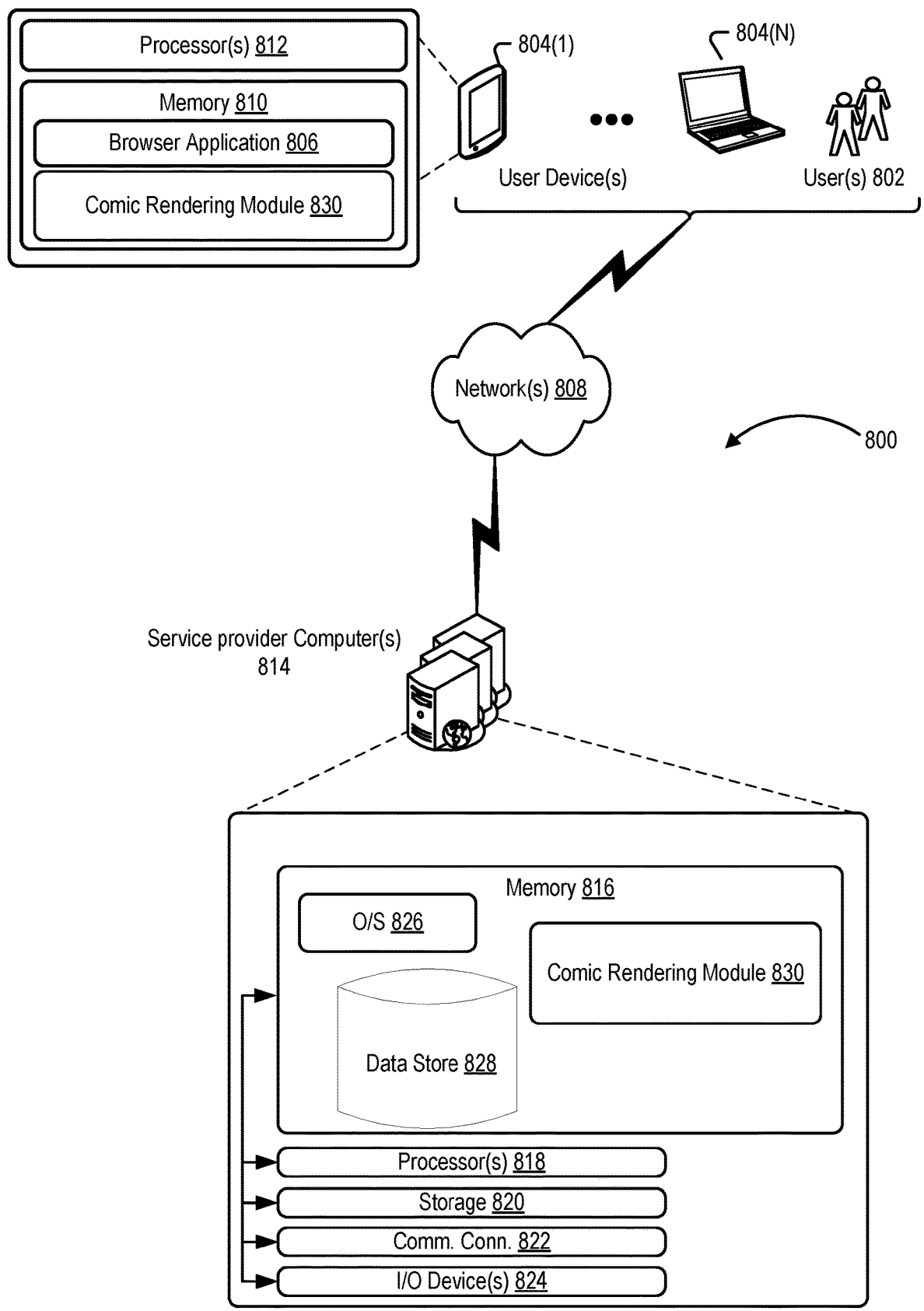
FIG. 8 illustrates an example architecture for implementing a comic book feature as described herein that includes a user device and one or more service provider computers which may be connected via one or more networks in accordance with at least one embodiment.

In some examples, service provider computers (service provider computers 108 and 814) and/or user devices (user device 104 and 804) utilizing at least the comic rendering module 830 depicted in FIGS. 1 and 8 may perform the processes 500 and 700 of FIGS. 5, 6, and 7. In FIG. 5, the process 500 may include obtaining a video comprising a visual data stream and an audio data stream at 502. In embodiments, the visual data stream and audio data stream may be associated with a video or an image. The video may correspond to a movie, a television episode, a streaming live event, streaming video game content, or user generated content such as videos and images captured by a user device. The process 500 may include parsing the visual data stream of the video into a plurality of frames at 504. In accordance with at least one embodiment, the service provider computers implementing the comic book feature may receive the visual data stream and audio data stream separate from the input data stream (e.g., video or image). The visual data stream and audio data stream may be extracted prior to processing by the service provider computers as opposed to the service provider computers extracting the visual data stream and audio data stream of an input data stream.

The process 500 may include determining scene boundaries to generate one or more scenes for the video based on the plurality of frames, a scene including a subset of frames of the plurality of frames at 506. In embodiments, a scene includes a subset of frames of the plurality of frames that comprise the visual data stream. The subset of frames may be of a duration that is less than the entirety of the duration of the video or visual data stream. In accordance with at least one embodiment, the service provider computers may utilize a color and edge histogram algorithm to determine the scene boundaries using the plurality of frames. The process 500 may include modifying each scene of the one or more scenes to remove a portion of the frames from the subset of frames at 508. In embodiments, removing the portion of the frames from the subset of frames aids in removing redundant frames thereby optimizing a selection of an appropriate key frame for the scene. The service provider computers may utilize a graph-partitioning algorithm or a submodular function optimization algorithm to remove the portion of the frames (redundant frames) from the subset of frames.

The process 500 may include determining a respective key frame from each modified scene where a key frame represents content included in a corresponding scene at 510. In accordance with at least one embodiment, the service provider computers may determine a key frame from the subset of frames that has had the portion of frames removed by selecting the frame that is in the middle of the subset of frames (e.g., the median frame of the subset of frames). In embodiments, the service provider computers may determine the key frame by using a facial detection algorithm and selecting the frame based on peak facial expression of faces included in a particular frame. The process 500 may include extracting the audio data stream from the video at 512. In embodiments, the audio data stream may include close captioning information associated with a video or image. The service provider computers may utilize a speech to text algorithm to generate the audio data stream from the audio of a video or image. The process 500 may include identifying an audio portion of the audio data stream that maps to the subset of frames for each key frame of the plurality of key frames based at least in part on time information included in the audio data stream at 514. For example, the audio data stream may include metadata or other information which includes timestamps that can be utilized by a computer device to display subtitles or audio at respective times during presentation of the video or image(s).

The process 500 may include converting each of the respective key frames to comic images based at least in part on an algorithm at 516. In embodiments, each key frame corresponds to a comic image of the comic images and a comic image includes a cartoon rendering of the key frame. For example, the video may include realistic or photorealistic images or data that are converted to a cartoon or comic style that is more typically associated with comic books. In accordance with at least one embodiment, the service provider computers may utilize a non-photorealistic rendering algorithm, a style-transfer algorithm, or a generative adversarial network algorithm that is trained using photorealistic data and non-photorealistic data. The process 500 may include determining, for each comic image, first dimensions and placement for a data object that includes the audio portion that corresponds to the comic image at 518. In embodiments, the data object may be presented as a speech bubble as is typically associated with a comic book image.

The data object may include a text conversion of the audio portion for the key frame that is enclosed within the dimensions of the data object. The data object may be placed at certain locations within the comic image so as to not occlude objects included in the comic image such as characters or certain objects. The process 500 may include generating comic panels for the comic images at 520. In accordance with at least one embodiment, the comic panel incorporates a corresponding data object using the determined first dimensions and placement so as to avoid occluding objects included in the comic panel. The process 500 may include determining a layout for the comic panels based at least in part on a layout algorithm at 522. The layout algorithm may be configured to access and iterate through a plurality of layout templates for the comic panels and generate a score for each layout for the comic panels in question. The layout algorithm may select the highest scoring layout for the comic panels which represents the optimized layout for the comic panels for a given comic book page of a comic book rendered for the input data stream. The process 500 may include rendering a comic book page that includes the comic panels using the determined layout at 524.

The process 700 may include parsing a visual data stream of a received video into a plurality of frames at 702. The process 700 may include determining scene boundaries to generate a scene for the video based on the plurality of frames, the scene including a subset of frames of the plurality of frames at 704. A scene may include a subset of frames of the plurality of frames. The process 700 may include determining a key frame for the scene using the subset of frames at 706. A key frame may represent content included in the subset of frame. The process 700 may include identifying an audio portion of an audio data stream of the received video that maps to the subset of frames based on time information included in the audio data stream at 708. In embodiments the audio data stream may be extracted from the video. The process 700 may include converting the key frame to a comic image based on an algorithm where the comic image includes a cartoon rendering of the key frame at 710.

The process 700 may include determining first dimensions and placement for a data object at 712. The first dimensions and placement for the data object may be based at least in part on second dimensions of the comic image and locations of objects within the comic image. The data object may include the audio portion that corresponds to the comic image (e.g., the converted text that would go in a speech bubble that is associated with the comic image). In accordance with at least one embodiment, the objects within the comic image may be detected and locations of the objects within the comic image may be determined by an object detection algorithm that analyzes the comic image. The process 700 may include generating a comic panel for the comic image that incorporates the data object using the determined first dimensions and the placement at 714. For example, the service provider computers implementing the comic book feature may render a comic panel that incorporates the data object in a location and of certain dimensions such that the corresponding audio portion is presented as a speech bubble for the associated comic image yet avoids obstructing or occluding characters or objects of the comic image in the comic panel.

FIG. 8 illustrates an example architecture for implementing a comic book feature as described herein that includes a user device and one or more service provider computers which may be connected via one or more networks in accordance with at least one embodiment. In architecture 800, one or more users 802 (e.g., customers, users, consumers, etc.,) may utilize user computing devices 804(1)-(N) (collectively, user devices 804) to access a browser application 806 or a user interface (UI) accessible through the browser application 806, via one or more networks 808 to request comic book rendering for video, television episodes, images, or user generated content. In embodiments, the one or more users 802 may utilize user computing devices 804(1)-(N) to access the browser application 806 or a UI accessible through the browser application 806, via one or more networks 808, to request rendering of a video or image into a comic book by the one or more service provider computers 814. Requesting a rendering of the video or image into the comic book may include the user 802, via the user device 804 and networks 808, providing an input data stream such as a video or image to the one or more service provider computers 814. The user 802 may interact with the browser application 806 of the user device 804 to select and transmit one or more videos or images to the one or more service provider computers 814 for rendering into a comic book. The one or more videos or images selectable by the user 802 via browser application 806 may be stored locally on the user device 804 or remotely on a remote server or cloud storage environment (not pictured). In embodiments, the one or more videos or images may be selected from a content provider such as an online content streaming service or online store. The "browser application" 806 can be any browser control or native application that can access and display a network page or other information such as a user interface of a native software application for selecting input data streams (e.g., videos or images), presenting rendered comic books, and data object interaction for a user interface according to the comic book feature described herein. A native software application may include an application or program that has been developed for use on a particular platform (such as an operating system) or a particular device (such as a particular type of mobile device or user device 804). In embodiments, the user device 804 may include one or more components for enabling the user 802 to interact with the browser application 806 such as input/output devices.

The user devices 804 may include at least one memory 810 and one or more processing units or processor(s) 812. The memory 810 may store program instructions that are loadable and executable on the processor(s) 812, as well as data generated during the execution of these programs. Depending on the configuration and type of the user devices 804, the memory 810 may be volatile (such as random access memory (RAM)) and/or non-volatile (such as read-only memory (ROM), flash memory, etc.). The user devices 804 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 804. In some implementations, the memory 810 may include multiple different types of memory, such as static random access memory (SRAM), dynamic random access memory (DRAM), or ROM.

Turning to the contents of the memory 810 in more detail, the memory 810 may include an operating system and one or more application programs or services for implementing the features disclosed herein. Additionally, the memory 810 may include one or more modules for implementing the features described herein including the comic rendering module 830.

The architecture 800 may also include one or more service provider computers 814 (service provider computers) that may, in some examples, provide computing resources such as, but not limited to, client entities, low latency data storage, durable data store, data access, management, virtualization, hosted computing environment or "cloud-based" solutions, electronic content performance management, electronic marketplace management, media streaming services, content generation, etc. The service provider computers 814 may implement or be an example of the service provider computer(s) described throughout the disclosure. The one or more service provider computers 814 may also be operable to provide site hosting, electronic marketplaces, media streaming services such as online content streaming services, computer application development, and/or implementation platforms, combinations of the foregoing, or the like to the one or more users 802 via user devices 804 and networks 808.

In some examples, the networks 808 may include any one or a combination of many different types of networks, such as cable networks, the Internet, wireless networks, cellular networks, and other private and/or public networks. While the illustrated examples represent the users 802 communicating with the service provider computers 814 over the networks 808, the described techniques may equally apply in instances where the users 802 interact with the one or more service provider computers 814 via the one or more user devices 804 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 814 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 814 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 814 may be in communication with the user device 804 via the networks 808, or via other network connections. The one or more service provider computers 814 may include one or more servers, perhaps arranged in a cluster or as individual servers not associated with one another.

In one illustrative configuration, the one or more service provider computers 814 may include at least one memory 816 and one or more processing units or processor(s) 818. The processor(s) 818 may be implemented as appropriate in hardware, computer-executable instructions, firmware, or combination thereof. Computer-executable instruction or firmware implementations of the processor(s) 818 may include computer-executable or machine-executable instructions written in any suitable programming language to perform the various functions described when executed by a hardware computing device, such as a processor. The memory 816 may store program instructions that are loadable and executable on the processor(s) 818, as well as data generated during the execution of these programs. Depending on the configuration and type of the one or more service provider computers 814, the memory 816 may be volatile (such as RAM) and/or non-volatile (such as ROM, flash memory, etc.). The one or more service provider computers 814 or servers may also include additional storage 820, which may include removable storage and/or non-removable storage. The additional storage 820 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 816 may include multiple different types of memory, such as SRAM, DRAM, or ROM.

The memory 816, the additional storage 820, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 816 and the additional storage 820 are all examples of non-transitory computer storage media. Additional types of non-transitory computer storage media that may be present in the one or more service provider computers 814 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 814. Combinations of any of the above should also be included within the scope of non-transitory computer-readable media.

The one or more service provider computers 814 may also contain communication connection interface(s) 822 that allow the one or more service provider computers 814 to communicate with a data store, another computing device or server, user terminals, and/or other devices on the networks 808. The one or more service provider computers 814 may also include I/O device(s) 824, such as a keyboard, a mouse, a pen, a voice input device, a touch input device, a display, speakers, a printer, etc.

Turning to the contents of the memory 816 in more detail, the memory 816 may include an operating system 826, one or more data stores 828, and/or one or more application programs or services for implementing the features disclosed herein including the comic rendering module 830. In accordance with at least one embodiment, the comic rendering module 830 may be configured to at least utilize received or obtained input data streams such as a video or image to convert to a comic book. The comic rendering module 830 may be configured to utilize a number of different algorithms, described herein, to convert videos and images to a comic book image rendering as well as generate text (speech bubbles) derived from audio associated with the video and images to incorporate into the comic book image. The comic rendering module 830 may be configured to extract a visual data stream and audio data stream from an input data stream such as a video. The comic rendering module 830 may be configured to simultaneously process the visual data stream and audio stream to generate data objects that will be integrated to generate a comic book image or comic panel. In accordance with at least one embodiment, the comic rendering module 830 may be configured to utilize an layout algorithm for determining an optimal layout for one or more comic panels to generate a comic book page of a comic book. The comic rendering module 830 may access one or more layout templates stored in data store 828 or via networks 808 from another location to determine an optimal layout of comic panels for each comic book page. The comic rendering module 830 may be configured to generate a digital comic book comprised of one or more comic book pages which can be transmitted to the user 802 and user device 804 via networks 808 for further viewing and interaction. The comic rendering module 830 may be configured to generate and maintain a mapping of portions of a video or an image which correspond to a particular comic panel of a comic book image and/or comic book. The mapping may be utilized to generate a link or hyperlink for viewing the portion(s) of a video or image from which a comic panel was derived for further viewing or interaction by the user 802 and user device 804.

Figure 9:
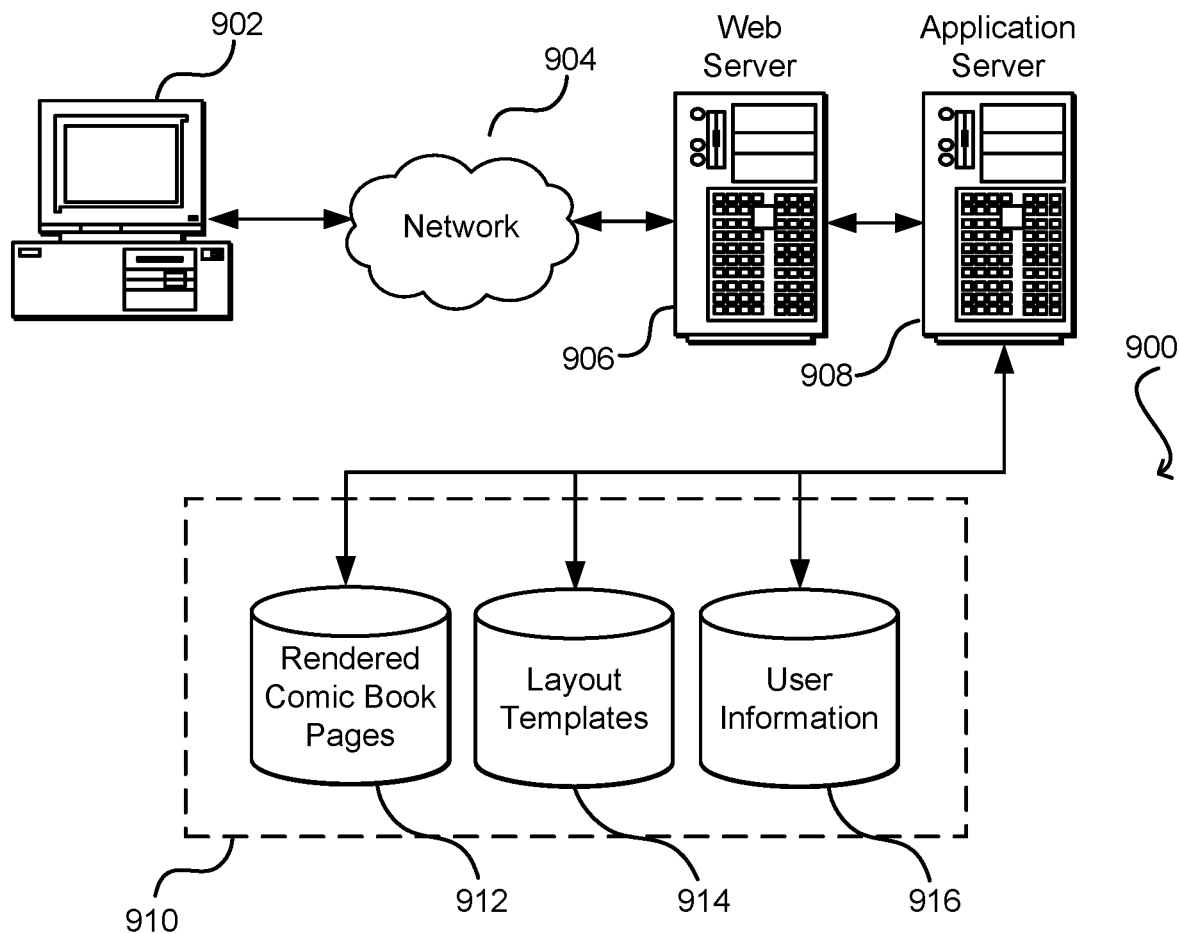
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing rendered comic book pages 912 and user information 916, which can be used to serve generate comic books and transmit the comic books to a user and/or user device. The data store also is shown to include a mechanism for storing log layout templates 914, which can be used for determining an optimal layout of comic panels for a comic book page. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser. In another example, a user might submit a request to convert a video or image to a comic book. The user might submit the video or image in question and the rendered comic book may be returned to the user for viewing via a Web page, browser, or application such as a native application of client device 902.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining, by a computer system, a video comprising a visual data stream and an audio data stream;
    parsing, by the computer system, the visual data stream of the video into a plurality of frames;
    determining, by the computer system, scene boundaries to generate one or more scenes for the video based at least in part on the plurality of frames, a scene of the scenes including a subset of frames of the plurality of frames;
    modifying, by the computer system, each scene of the one or more scenes to remove a portion of the frames from the subset of frames;
    determining, by the computer system, a respective key frame from each modified scene, a key frame representing content included in a corresponding scene;
    extracting, by the computer system, the audio data stream from the video;
    identifying, by the computer system, an audio portion of the audio data stream that maps to the subset of frames for each key frame of a plurality of key frames based at least in part on time information included in the audio data stream;
    converting, by the computer system, each of the respective key frames to comic images based at least in part on an algorithm, each key frame corresponding to a comic image of the comic images, and the comic image including a cartoon rendering of the key frame;
    determining, by the computer system and for each comic image, first dimensions and placement for a data object that includes the audio portion that corresponds to the comic image;
    generating, by the computer system, comic panels for the comic images, a comic panel of the comic panels incorporating a corresponding data object using the determined first dimensions and the placement;
    determining, by the computer system, a layout for the comic panels based at least in part on a layout algorithm;
    rendering, by the computer system, a comic book page that includes the comic panels using the determined layout;
    maintaining, by the computer system, a mapping of portions of the video to particular comic panels of the comic panels based at least in part on the visual data stream of the video; and
    updating, by the computer system, the rendering of the comic book page to integrate a hyperlink for redirecting from the comic book page to a portion of the video of the portions of the video that corresponds to a particular comic panel of the particular comic panels based at least in part on the mapping.

2. The computer-implemented method of claim 1, further comprising redirecting, by the computer system, the comic book page to a user interface to present the video portion in response to input associated with an interaction with the particular comic panel and the hyperlink.

3. The computer-implemented method of claim 1, wherein determining the first dimensions and the placement for the data object is based at least in part on second dimensions of the comic image and locations of objects within the comic image.

4. The computer-implemented method of claim 1, wherein the layout algorithm is configured to iterate through a plurality of layout templates for the comic panels and generate a score for each layout of the plurality of layout templates based at least in part on a set of criteria, the score representing an optimized layout for the comic panels.

5. A computer-readable storage medium storing computer-executable instructions that, when executed by a computer system, configure the computer system to perform operations comprising:
    parsing a visual data stream of a received video into a plurality of frames;
    determining scene boundaries to generate a scene for the video based at least in part on the plurality of frames, the scene including a subset of frames of the plurality of frames;

determining a key frame for the scene using the subset of frames, the key frame representing content included in the subset of frames;

identifying an audio portion of an audio data stream of the received video that maps to the subset of frames based at least in part on time information included in the audio data stream, the audio data stream extracted from the received video;

converting the key frame to a comic image based at least in part on an algorithm, the comic image including a cartoon rendering of the key frame;

determining first dimensions and placement for a data object based at least in part on second dimensions of the comic image and locations of objects within the comic image, the data object including the audio portion for the comic image;

generating a comic panel for the comic image that incorporates the data object using the determined first dimensions and the placement;

maintaining a mapping of portions of the video to the comic panel based at least in part on the video and the plurality of frames; and rendering a comic book page that includes the comic panel and an integration of a hyperlink for redirecting from the comic book page to a portion of the video of the portions of the video that corresponds to the comic panel based at least in part on the mapping.

6. The computer-readable storage medium of claim 5, wherein the algorithm includes a non-photorealistic rendering algorithm, a style-transfer algorithm, or a generative adversarial network algorithm.

7. The computer-readable storage medium of claim 5, wherein determining the first dimensions and the placement for the data object includes using an object detection algorithm on the comic image to detect the objects and the locations of the objects within the comic image.

8. The computer-readable storage medium of claim 5, wherein determining the first dimensions and the placement for the data object includes avoiding the locations of the objects within the comic image.

9. The computer-readable storage medium of claim 5, wherein the operations further comprise editing the audio portion to remove certain portions based at least in part on the first dimensions and the placement of the data object.

10. The computer-readable storage medium of claim 9, wherein editing the audio portion is further based at least in part on input from an entity reviewing the audio portion.

11. The computer-readable storage medium of claim 5, wherein determining the key frame includes selecting a particular frame from the subset of frames that corresponds to a middle of the subset of frames.

12. The computer-readable storage medium of claim 5, wherein determining the key frame includes selecting a particular frame from the subset of frames based at least in part on a facial detection algorithm.

13. A computer system comprising:
a memory configured to store computer-executable instructions; and
a processor in communication with the memory configured to execute the computer-executable instructions to at least:
parse a visual data stream of a received video into a plurality of frames;
determine scene boundaries to generate a scene for the video based at least in part on the plurality of frames, the scene including a subset of frames of the plurality of frames;
determine a key frame for the scene using the subset of frames, the key frame representing content included in the subset of frames;
identify an audio portion of an audio data stream of the received video that maps to the subset of frames based at least in part on time information included in the audio data stream, the audio data stream extracted from the received video; and
convert the key frame to a comic image based at least in part on an algorithm, the comic image including a cartoon rendering of the key frame;
determine first dimensions and placement for a data object based at least in part on second dimensions of the comic image and locations of objects within the comic image, the data object including the audio portion for the comic image;
generate a comic panel for the comic image that incorporates the data object using the determined first dimensions and the placement;
maintain a mapping of portions of the video to the comic panel based at least in part on the video and the plurality of frames; and
render a comic book page that includes the comic panel and an integration of a hyperlink for redirecting from the comic book page to a portion of the video of the portions of the video that corresponds to the comic panel based at least in part on the mapping.

14. The computer system of claim 13, wherein the processor is further configured to:
determine first dimensions and placement for a data object based at least in part on second dimensions of the comic image and locations of objects within the comic image, the data object including the audio portion for the comic image; and
generate the comic panel for the comic image that incorporates the data object using the determined first dimensions and the placement.

15. The computer system of claim 13, wherein the processor is further configured to modify the scene to remove a portion of frames from the subset of frames prior to determining the key feature, wherein removing the portion of the frames is based at least in part on a graph-partitioning algorithm or a submodular function optimization algorithm.

16. The computer system of claim 13, wherein determining the scene boundaries is further based at least in part on information from a content creator associated with the video.

17. The computer system of claim 13, wherein the processor is further configured to associate the audio portion to a particular object in the comic image based at least in part on a speaker identification algorithm.

18. The computer system of claim 13, wherein the processor is further configured to generate the audio data stream based at least in part on a speech to text algorithm using audio of the video.

19. The computer system of claim 18, wherein generating the audio data stream is further based at least in part on close captioning information associated with the video.

* * * * *